March 17, 1942.  C. W. MOORE  2,276,411
DIRECTION SIGNAL SWITCH
Filed Oct. 29, 1940  3 Sheets-Sheet 1
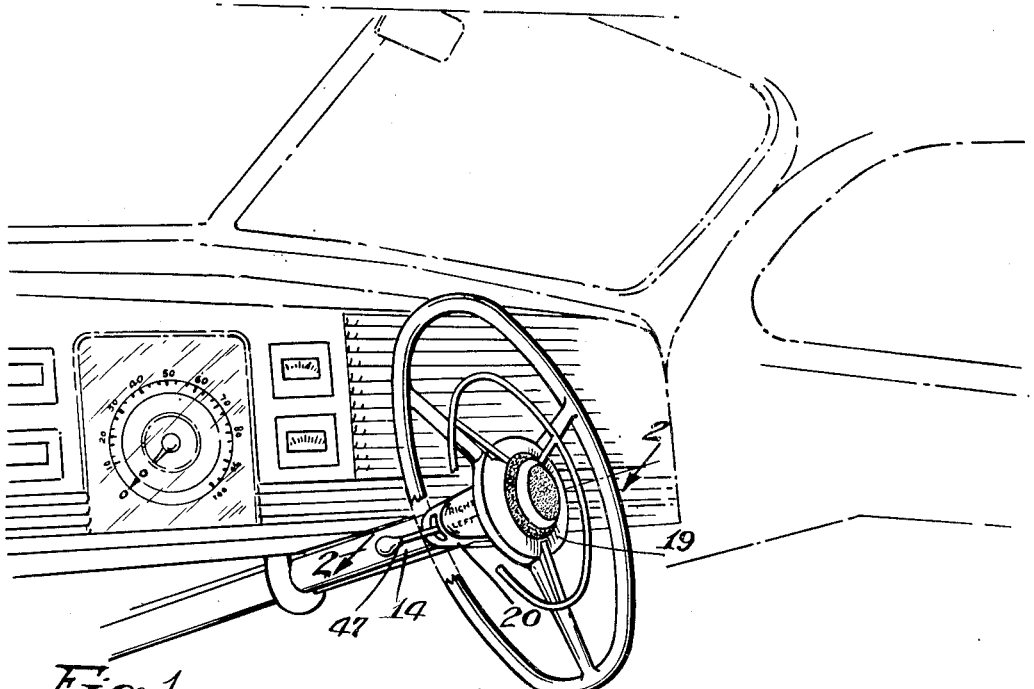
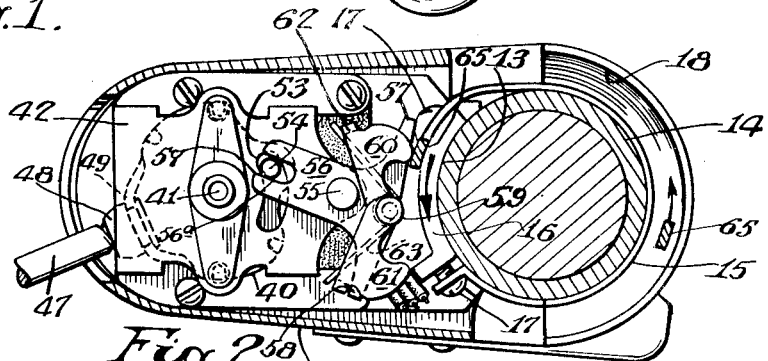
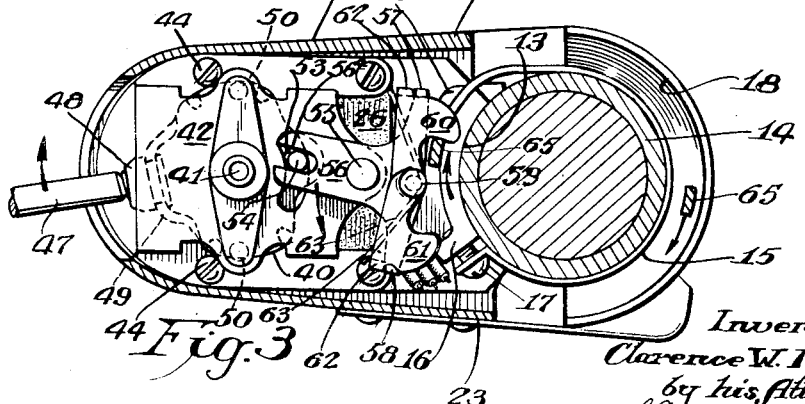
Inventor:—
Clarence W. Moore
by his Attorneys
Howson & Howson March 17, 1942.                C. W. MOORE                2,276,411
                           DIRECTION SIGNAL SWITCH
                           Filed Oct. 29, 1940         3 Sheets-Sheet 2
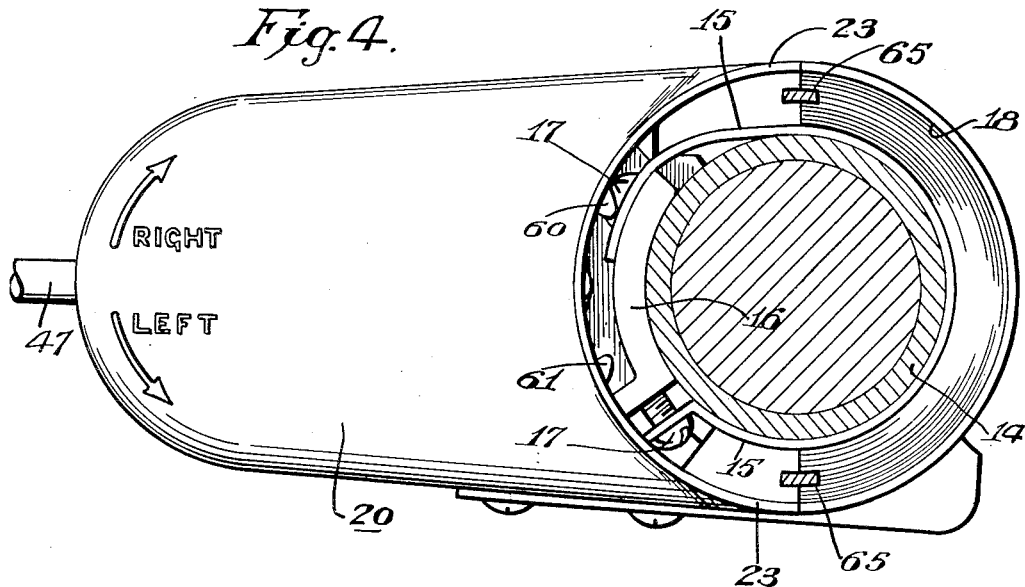
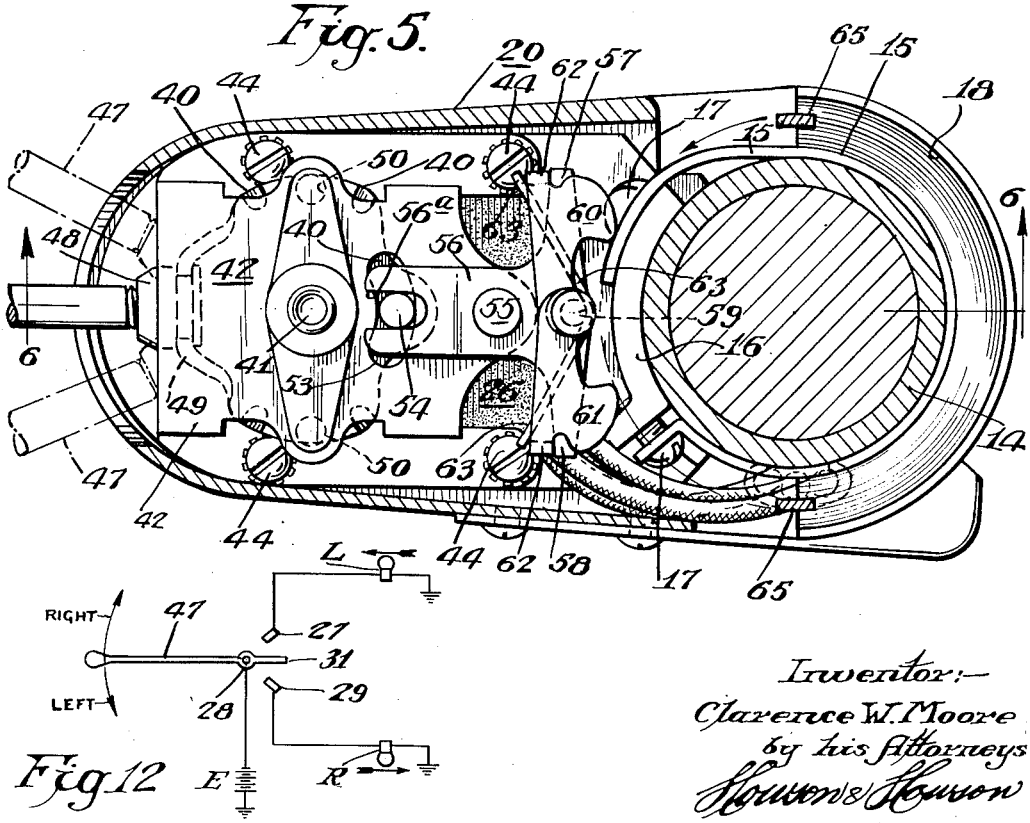

March 17, 1942. C. W. MOORE 2,276,411
DIRECTION SIGNAL SWITCH
Filed Oct. 29, 1940 3 Sheets-Sheet 3
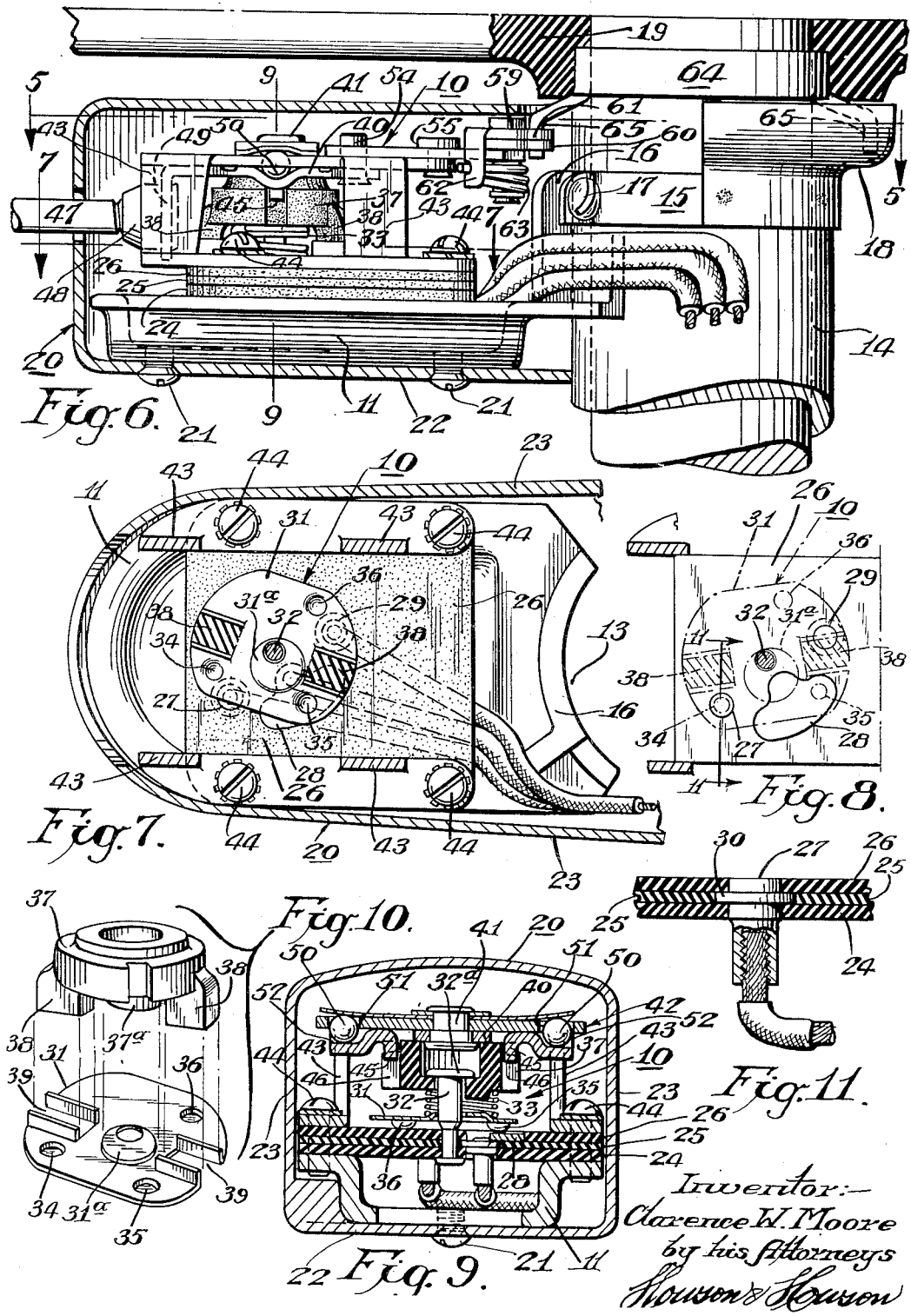

Patented Mar. 17, 1942

2,276,411

UNITED STATES PATENT OFFICE 2,276,411

DIRECTION SIGNAL SWITCH

Clarence W. Moore, Roslyn, Pa., assignor to United Specialties Co., Detroit, Mich., a corporation of Delaware Application October 29, 1940, Serial No. 363,344

5 Claims. (Cl. 200—59)

This invention relates to new and useful improvements in electric switch mechanisms and more particularly to switch mechanisms adaptable for use in conjunction with direction indicating signal systems of automobiles and like vehicles.

The principal object of the present invention is to provide an electric switch mechanism of the character set forth which embodies certain novel features of construction and operation whereby the direction signal is set manually prior to making a turn, remains set during the making of such turn, and then is automatically discontinued upon the resumption of a straight course after the turn has been made.

Another object of the invention is to provide a novel switch mechanism of the type described which is constructed and operable so that the signal is discontinued automatically in the event that the vehicle is turned in the direction opposite to that indicated by such signal.

A further object of the present invention is to provide a switch mechanism of the stated character which is of relatively simple, compact construction and readily installed and operated in an automobile or like vehicle.

These and other objects of the invention and the various features and details of the construction and operation thereof are hereinafter fully set forth and described and shown in the accompanying drawings, in which:

Figure 1 is a perspective view showing a direction signal switch embodying the present invention associated with the steering mechanism of an automobile.

Figure 2 is a view in section taken on line 2—2, Figure 1, showing the direction switch set for left turn.

Figure 3 is a view similar to Figure 2 showing the switch being returned to neutral or "off" position.

Figure 4 is a plan view showing the switch attached to the steering column of an automobile.

Figure 5 is a view in section taken on line 5—5, Figure 6, showing the switch parts in neutral or "off" position.

Figure 6 is a view in section taken on line 6—6, Figure 5.

Figure 7 is a view in section taken on line 7—7, Figure 6, showing the switch contacts in neutral or "off" position.

Figure 8 is a fragmentary view in section similar to the disclosure of Figure 7 showing the switch contacts set for left turn.

Figure 9 is a transverse view in section taken on line 9—9, Figure 6.

Figure 10 is an exploded view in perspective of the switch plate and associated turning member.

Figure 11 is a fragmentary view in section taken on line 11—11, Figure 8 showing the details of a switch contact mounting; and Figure 12 is a diagrammatic view of the electrical circuit for a direction indicating signal system comprising the switch of the present invention.

Referring now more particularly to the drawings, a switch mechanism generally designated by the numeral 10 is mounted on a suitable base member 11 which is concaved at one end 13 to receive the steering column or post 14 of an automobile or like vehicle. The base member 11 is secured to the column 14 by a strap 15 which encircles the column and is fastened by screws or the like 17 to an upstanding lug 16 of said base member 11 as shown in Figures 5 and 6. The strap 15 is provided with an upper cup-shaped portion 18 which provides a protective guard or housing for certain parts hereinafter described and located at the under side of the steering wheel hub 19. The base member 11 is secured within a housing 20 by means of screws or the like 21 in the lower portion 22 thereof and the side portions 23 of the said housing are extended as at 23 to join the member 18 thereby completely enclosing the switch and the underside of the steering wheel hub 19 as shown in Figures 4, 5 and 6 of the drawings. In lieu of this clamp-strap arrangement 15, the collar 64 may be secured upon the steering shaft and the switch casing screwed directly to the steering column if desired.

Referring now to the construction of the switch mechanism 10, secured upon the base member 11 are three plates 24, 25 and 26 of insulating material and these have electrical contacts 27, 28 and 29 secured therein. As shown in Figure 11 these contacts are secured in place and held by the upper and lower plates 24 and 26 by flanging each of the contacts as at 30 so that the said plates 24 and 26 engage above and below said flanges 30 (see Figure 11).

Referring now to Figure 9, a switch plate 31 is rotatably mounted on a stud 32 which is fixedly secured at its lower end in the plate 24, 25 and 26, and this plate 31 has downwardly pressed out contact elements 34, 35 and 36 arranged for selective contact with the aforesaid contacts 27, 28 and 29, the said plate 31 being urged downwardly by means of a coil spring or the like 33.

As shown in Figures 7 and 8, the contact 28 is of relatively large surface area in order that the contact 35 of the switch plate 31 always will be in engagement therewith.

The several contacts of the switch all reside more or less at one side of the switch plate 31 and in order to insure good contact thereby and also to prevent rocking of the said switch plate, the aforesaid coil spring 33 is preferably eccentrically mounted about the stud 32 so that said spring 33 exerts the greater proportion of its pressure upon that portion of the plate 31 in which are located the contacts 34, 35 and 36. The spring 33 is held eccentrically of the shaft 32 by means of the pressed out portion 31a of plate 31 and boss 37a of a member 37.

The member 37 is of dielectric material and is rotatably held upon the stud 32 by the head portion 32a of the latter. Projecting from diametrically opposite sides of the member 37 are depending lugs 38 which more or less loosely engage correspondingly formed slots 39 in the previously described switch plate 31 (see Figure 10) whereby rotation of the member 37 is imparted directly to the said switch plate 31.

Overlying this member 37 is a plate 40 which is rotatably mounted on a stud 41 secured in an overlying house or bridge member 42 having depending leg portions 43 secured to opposite sides of the switch base structure as by means of screws 44. The plate 40 is provided with diametrically arranged depending lugs 45 which engage slots or notches 46 in the periphery of the member 37 whereby rotation of the said plate 40 is imparted to said member 37, and by the latter to the switch plate 31 as aforesaid. This construction is best illustrated in Figure 9 of the drawings. Rotary movement is imparted manually to the plate 40 by means of a handle or the like 47 which is threaded into a bushing 48 projecting from a depending lug 49 at the outer side or end of the said plate 40 as shown in Figure 6.

For the purpose of retaining the various rotary elements of the switch in the several positions to which actuated there is provided a pair of ball checks 50 disposed in openings 51 in the top of the bridge member 42 and resiliently urged into suitably located pairs of recesses or sockets 52 in the plate 40 by means of a spring member secured upon the top of the bridge member 42 by the aforesaid stud 41.

Carried by and projecting upwardly from the inner edge of the plate 40 through an arcuate slot 53 in the bridge 42 is a pin 54. This pin 54 moves with the plate 40 in the slot 53 and the latter functions to limit movement of the switch parts between the two "on" positions of the switch, the "off" position thereof residing between said "on" positions and hence within the limit of movement of the switch parts.

Pivotally mounted centrally of the inner edge of the top of the bridge 42 by means of a rivet or the like 55 is a member 56 having arms 57 and 58 projecting laterally from its outer end. The inner end of this member 56 is bifurcated as at 56a to receive the pin 54 which operates to actuate the member 56 when the plate 40 and other switch parts are actuated, the arrangement being such that rotation of the plate 40 in one direction causes the member 56 to pivot in the opposite direction.

A pair of actuator elements 60 and 61 having the form and configuration shown in Figures 2 and 3 of the drawings are pivotally mounted centrally of the outer end of the member 56 upon a common pin 59, and these elements normally extend in opposite directions laterally of the said member 56 and above its arm portions 57 and 58 substantially tangent to the steering column 14 and means carried thereby for actuating said elements. Depending lugs 62 are formed at the outer ends of the elements 60 and 61 and these are resiliently urged against the inner edges of the arms 57 and 58 by means of a spring 63 which is coiled about the pin 59 and has its opposite end portions engaging rearwardly or behind said depending lugs 62 of the elements 60 and 61.

A collar 64 is carried by and rotatable with the steering wheel and its shaft or column and from this collar 64 projects a pair of diametrically spaced lugs 65, 65 which move in a path spaced somewhat from the steering column and adjacent the elements 60 and 61 when in the neutral or "off" position of the switch shown in Figure 5 of the drawings.

The electrical circuit in which the switch is employed is shown in Figure 12 of the drawings and is relatively simple comprising, in addition to said switch, a battery or other source of electric energy E and a pair of lamps L and R for indicating, respectively, a turn in a left or right hand direction. These lamps are usually mounted at or upon the rear of the vehicle so as to be readily visible to the driver of a vehicle travelling behind. As shown in said Figure 12, the contact 28 is connected to one side of the battery E while the contact 27 is connected to the lamp L and contact 29 to the lamp R, the said lamps and the other side of the battery E being grounded to the vehicle chassis or body in the usual manner.

As previously stated, the contact 35 of switch plate 31 at all times is in engagement with the line contact 28 and the arrangement of the several contacts and extent of movement of the switch parts as limited by slot 53 is such that when the switch is actuated by the handle 47 to the "on" position shown in Figure 2 to indicate a left hand turn the contact 34 of switch plate 31 engages the contact 27 to complete the circuit from the battery E through contact 28, plate 31 and contact 34 to the lamp L. On the other hand, by moving the switch to the "on" position shown in Figure 3, for a right turn indication, the contact 36 of the plate 31 will engage the contact 29 thereby completing the circuit from contact 28 through plate 31 and contact 29 to the lamp R.

In addition to the foregoing, when the switch is positioned as aforesaid to indicate a left hand turn, the accompanying pivotal movement of the member 56 in the opposite direction serves to project the element 60 outwardly and into the path of travel of the previously mentioned lugs 65, 65 as shown in Figure 2, while at the same time moving the actuator 61 further away from that path of travel.

Now with the switch thus positioned, if the steering wheel is turned to the left in accordance with the intention indicated by this left hand setting of the switch by the handle 47, the lugs 65, 65 travelling in a counterclockwise direction with the steering wheel will have no effect upon the switch mechanism except to depress outwardly the element 60 about its pivot 59 and against the action of the spring 63. However after the left turn has been made and the vehicle then straightened out by a right hand or clockwise turning of the steering wheel, one or the other of the lugs 65, 65 moving in like direction will engage the element 60 in such manner as to actuate it and the member 56 as well as the plate 40 and other switch parts into the neutral or "off" position of the device, thereby automatically discontinuing the signal and resetting the switch for further use.

Also by this arrangement, it will be seen that should the vehicle be turned to the right in a direction contrary to that indicated by the signal, the initial right hand turning of the steering wheel in a clockwise direction will operate as above to quickly cancel the inconsistent signal. In the case of the setting of the signal to indicate a right turn, the operation of the device is similar except that the element 61 is involved, and the various operations are effected by movements of the steering in directions opposite those given above for the left hand signal position of the switch mechanism.

Too, the construction and arrangement of the switch mechanism and its spring biased actuator elements 60 and 61 is such that should either of the lugs 65 be in a position contacting the elements 60 and 61, as shown in Figure 2 of the drawings, there will result no interference with manual operation of the switch, and the operator of the vehicle is, therefore, able manually to operate and set the switch at will regardless of the relative positions of said lugs 65 with respect to the elements 60, 61. Furthermore, should the driver manually hold the handle 47 in an "on" position of the switch and then turn the steering wheel in a direction that would normally actuate the switch to "off" position, the construction and arrangement of the elements 60, 61 is such that they will yield under the pressure of spring 63 thereby preventing damage to the switch mechanism in such a situation.

Accordingly, it will be seen from the foregoing that the switch mechanism of the present invention provides a vehicle direction signal switch wherein the manually set signal remains set during the making of the indicated turn, and then is automatically discontinued and the mechanism reset for further use, while at the same time effectively provides for discontinuance of the signal in the event that the vehicle is turned in the direction opposite to that indicated by the signal. The switch mechanism and its associated parts are further characterized by their relative simplicity, compact construction and inexpensive manufacturing cost.

While a particular embodiment of the invention has been herein illustrated and described, it is not intended to limit said invention to such disclosure but that changes and modifications may be made and incorporated therein and thereto within the scope of the annexed claims.

I claim:

1. A switch mechanism of the type described comprising a rotatable contact plate cooperable with a plurality of stationary contact elements, rotatable means movable in opposite directions including a member manually operable for imparting rotary movement to said contact plate to operate the switch, a projection carried by said rotatable means and movable within a slot operable to limit the extent of rotation of the rotatable means and the switch to movement between two "on" positions and an intermediate "off" position thereof, a rotatable member engaged by said projection for actuation thereby upon movement of the rotatable means, and a pair of elements carried by said member and arranged thereon so that upon movement of the member in one direction one of said elements is moved into a projected position and the other into a retracted position and upon movement of said member in the opposite direction the one element is retracted and said other element projected, said elements and the member being constructed and arranged so that one of said elements when projected and actuated in one direction only will actuate said member and operate the switch and the other of said elements when projected and actuated in the opposite direction only will actuate the member and operate the switch.

2. A switch mechanism of the type described comprising a rotatable contact plate cooperable with a plurality of stationary contact elements, rotatable means movable in opposite directions including a member manually operable for imparting rotary movement to said contact plate to operate the switch, a projection carried by said rotatable means and movable within a slot operable to limit the extent of rotation of the rotatable means and the switch to movement between two "on" positions and an intermediate "off" position thereof, spring urged means tending to maintain the rotatable means and switch in any of the "on" and "off" positions of said switch, a rotatable member comprising a bifurcated portion engaged by said projection for actuation thereby upon movement of the rotatable means, and a pair of spring-biased elements carried by said member and arranged thereon so that upon movement of the member in one direction one of said elements is moved into a projected position and the other into a retracted position and upon movement of said member in the opposite direction the one element is retracted and said other element projected, said elements and the member being constructed and arranged so that one of said elements when projected and actuated in one direction only will actuate said member and operate the switch and the other of said elements when projected and actuated in the opposite direction only will actuate the member and operate the switch.

3. A switch mechanism as claimed in claim 2 wherein the spring-biased elements are provided with depending lugs and the member has laterally projecting arm portions against which said lugs normally engage.

4. In a vehicle direction signal system wherein the vehicle steering mechanism carries switch operating means, a switch mechanism comprising a rotatable contact plate cooperable with a plurality of stationary contacts, means for manually operating said switch mechanism, and a pair of spring-biased pawls having a common pivot and extending substantially tangent to the switch operating means, said pawls being arranged so that upon actuation of said manual operating means one or the other of the pawls is projected into the path of travel of said switch operating means for engagement thereby, and said pawls being constructed and arranged so that engagement of one pawl by the switch operating means moving in one direction only actuates the switch mechanism and engagement of the other pawl by said means moving in the opposite direction only actuates said switch mechanism.

5. In a vehicle direction signal system wherein the vehicle steering mechanism carries switch operating means, a switch mechanism comprising a rotatable contact plate cooperable with a plurality of stationary contacts, means for manually operating said switch mechanism, a member actuable by said switch operating means, and a pair of spring-biased pawls having a common pivot carried by said member and extending substantially tangent to the switch operating means, said member and said pawls being arranged so that upon actuation of said manual operating means one or the other of the pawls is projected into the path of travel of said switch operating means for engagement thereby, and said pawls being constructed and arranged so that engagement of one pawl by the switch operating means moving in one direction only actuates the switch mechanism and engagement of the other pawl by said means moving in the opposite direction only actuates said switch mechanism.

CLARENCE W. MOORE.